United States Patent

Brovman et al.

[11] 4,127,258
[45] Nov. 28, 1978

[54] MACHINE FOR GAS-CUTTING OF METALS

[76] Inventors: Mikhail Y. Brovman, ulitsa N.Kurchenko, 12, kv. 22; Ivan K. Marchenko, ulitsa Lenina, 6, kv. 94; Nikolai Y. Mushenko, ulitsa N.Kurchenko, 15, kv. 48; Alfred A. Pilipenko, ulitsa Katerinicha, 17, kv. 28; Vladimir A. Tkalenko, prospekt Mira, 2, kv. 62; Vladimir N. Romadin, ulitsa B.Khmelnitskogo, 28, kv. 2; Gennady P. Larin, ulitsa Sotsialisticheskaya, 57, kv. 5, all of Kramatorsk, U.S.S.R.

[21] Appl. No.: 787,763

[22] Filed: Apr. 15, 1977

[51] Int. Cl.² .............................................. B23K 7/08
[52] U.S. Cl. .................................. 266/73; 219/124.4; 266/77
[58] Field of Search ........................ 266/67, 68, 73, 72, 266/77; 219/124.22, 124.33, 124.34, 124.4

[56] References Cited

U.S. PATENT DOCUMENTS

| 2,749,421 | 6/1956 | Mikulak et al. | 266/73 |
| 3,543,989 | 12/1970 | Cooper | 266/73 X |
| 3,665,148 | 5/1972 | Yasenchak et al. | 266/67 X |
| 3,819,162 | 6/1974 | Inomata et al. | 266/68 |

FOREIGN PATENT DOCUMENTS 469,551  8/1975  U.S.S.R. .................................. 266/73

Primary Examiner—Roy Lake
Assistant Examiner—Paul A. Bell
Attorney, Agent, or Firm—Lackenbach, Lilling & Siegel

[57] ABSTRACT

Disclosure is made of a machine in which, according to the invention, a tool carriage is mounted on the crossbeam for rotation in a plane perpendicular to the axis of the crossbeam. A rod rigidly coupled with a cutting torch is mounted on the tool carriage. This rod is fixed on the crossbeam for rotation and longitudinal reciprocation in a plane parallel to the axis of the crossbeam.

4 Claims, 2 Drawing Figures

MACHINE FOR GAS-CUTTING OF METALS

FIELD OF THE INVENTION

The invention relates to equipment for gas-flame working of metals and, more particularly, it relates to machines for gas-cutting of metals.

The invention can be utilized to utmost effectiveness at metallurgical plants where large steel castings (as thick as 900 mm to 2000 mm) are made for cutting-off surplus metal and also for preparing metal scrap for further working.

DESCRIPTION OF THE PRIOR ART

In the Soviet Union, there is employed a machine for gas-cutting of metals comprising a rotatable column mounted on a mobile platform and supporting a crossbeam mounted in a cantilever fashion. The free end of the crossbeam supports a carriage which is movable therealong and which supports a cutter with a copying device. The cutter, in turn, is connected with the carriage for reciprocation in a direction perpendicular to the axis of the crossbeam.

Reciprocation of the carriage along the crossbeam is provided for by the incorporation of a chain transmission, the end of the chain being rigidly fixed to the carriage base, and of a drive having the driving and driven sprockets thereof fastened at the ends of the crossbeam.

Reciprocation of the cutting torch in a direction perpecdicular to the axis of the crossbeam is provided for in the known machine by the cutting torch being operatively coupled with the carriage, the carriage being supported on the crossbeam which itself is vertically along the column.

Thus the hitherto known device provides for motion of the cutting torch in three directions, viz, in a direction perpendicular to the axis of the crossbeam (vertical reciprocation of the crossbeam jointly with the cutting torch), reciprocation longitudinally of the crossbeam (the cutting in a plane of a cut motion) and rotation in a plane parallel to the axis of the crossbeam (for cutting angle adjustment).

However, the hitherto known machine does not provide for cutting work placed randomly in the operating zone of the cutting torch, as it is devoid of a mechanism for rotation of the cutting torch in a plane perpendicular to the longitudinal axis of the crossbeam. Further, the machine could not cope with cutting work of variable cross-section, and could not vary the cutting angle at the initial stage of cutting of works as thick as 2000 mm, which complicates the cutting process and affects the quality of the surface of a cut.

SUMMARY OF THE INVENTION

It is the main object of the present invention to provide a machine for gas-cutting of metals, which would provide for a substantial reduction of the time required for placing the cutting torch at the desired line of cutting.

It is another object of the present invention to provide the above-specified machine, which would offer a higher maneuverability than hitherto known machines of a similar kind.

It is still another object of the present invention to provide the above-specified machine, which would enhance the quality of the surface of a cut.

It is yet another object of the present invention to provide a machine for gas-cutting of metals, which would facilitate the process of cutting workpieces of large cross-sectional areas of a rectangular cross-section.

It is a further object of the present invention to provide the above-specified machine which would enable the cutting of workpieces in various three-dimensional positions.

These and other objects are attained by a machine for gas-cutting of metals comprising a mobile platform having mounted thereon a rotatable column supporting a crossbeam fixed on the column in a cantilever fashion. On the free end of the crossbeam a carriage reciprocable along the crossbeam is supported. The carriage supports a cutting torch and a copying arrangement movable in a direction perpendicular to the axis of the crossbeam. In accordance with the invention, the carriage is mounted on the crossbeam for rotation in a plane perpendicular to the axis of the crossbeam and supports a rod attached to, and extending perpendicularly from the axis of, the crossbeam, for rotation in a plane parallel with the axis of the crossbeam. The rod is rigidly coupled with the cutting torch.

The provision of a tool carriage rotatable in a plane perpendicular to the axis of the crossbeam enables presetting of a required angle of inclination of the cutting torch in the same plane with respect to a vertical axis, which is essential for cutting of workpieces randomly positioned in the operating zone of the cutting torch.

In this way the time required for setting the cutting torch to a required line of cutting is substantially reduced.

The provision of a rod rigidly coupled with the cutting torch and mounted on the tool carriage for rotation in a plane parallel to the axis of the carriage offers the necessary maneuverability of the cutting torch for cutting workpieces of a large cross-sectional area of a rectangular cross-section, due to the cutting torch being adjustable to the required angle for cutting into the metal at the initial stage of a cut and also adjustable to a different angle at the successive stages of the cut, which not only enhances the quality of the surface of the cut, but also facilitates the cutting process and reduces the overall cutting time.

By superimposing the motion of the mobile platform upon that of the carriage of the herein disclosed machine, complex three-dimensional cutting paths of the cutting torch can be obtained, which is essential when a workpiece is to be cut along a complicated curve.

It is preferable that the carriage should be rotatable by means of a bevel gear couple, of which one gear is immovably fixed to the base of the carriage and another gear is operatively coupled with a drive.

With the carriage of this structure, the construction of the carriage-rotating mechanism is simplified and the overall dimensions thereof are reduced.

It is also preferable that the rod with the cutting torch should be rotatable by a drive accommodated within the housing of the carriage and having an output shaft supporting the rod. This would simplify the structure of the torch-rotating mechanism, reduce its overall dimensions and enhance the reliability of its performance.

BRIEF DESCRIPTION OF THE DRAWINGS

The present invention will be further described in connection with an embodiment thereof, with reference being had to the accompanying drawings, wherein.

Referring now in particular to the appended drawings, there is herein disclosed a machine for gas-cutting of metals which in the presently described embodiment is primarily intended for cutting or severing metal ingots or castings of large cross-sectional areas, e.g., as thick as 2000 mm, produced by either continuous or semicontinuous metal-casting plants. However, the machine of the disclosed embodiment can also be employed for cutting surplus metal off large steel castings randomly positioned within the operating zone of the cutting torch.

Figure 1:
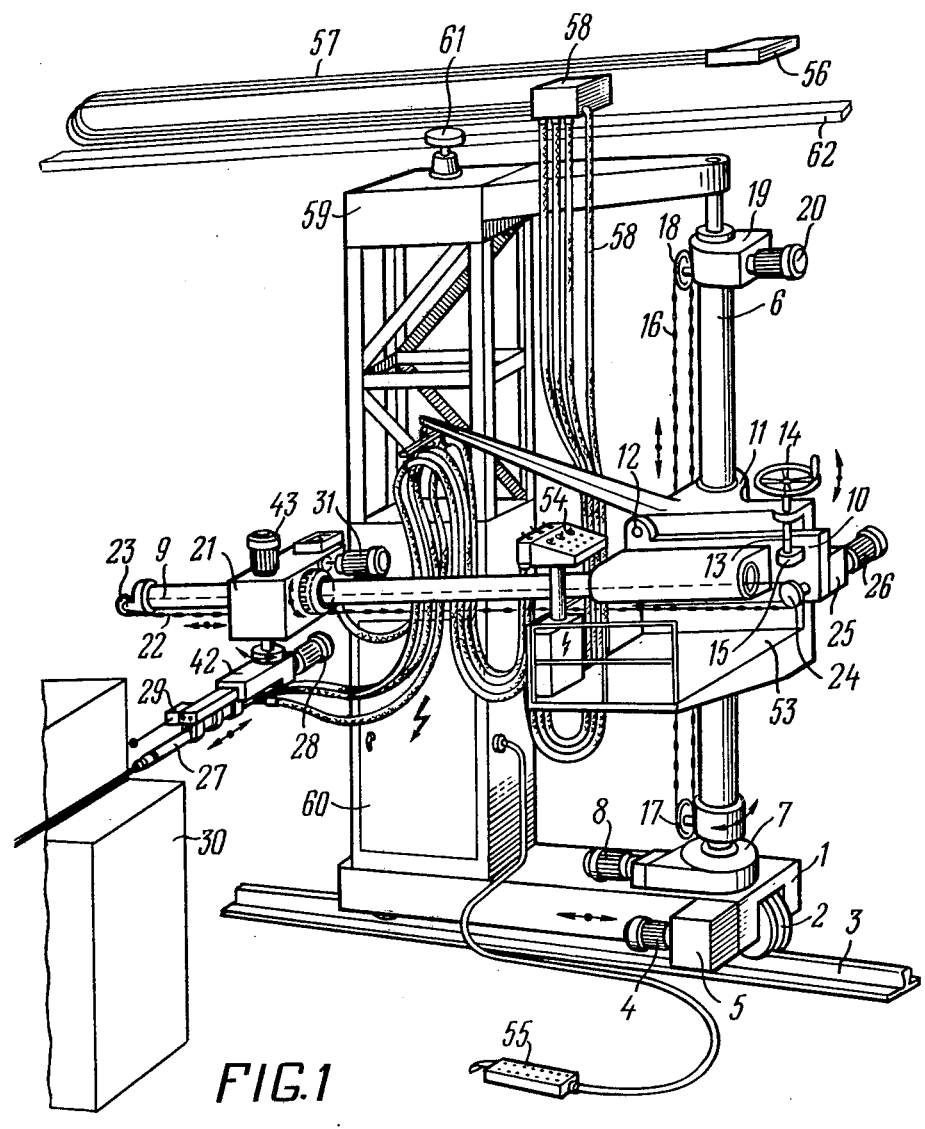
FIG. 1 is a perspective view illustrating a general view of a machine for gas-cutting of metals, embodying the invention.

In the drawings, the machine comprises a mobile platform 1 (FIG. 1) including an all-welded frame on two wheels 2 movable along a monorail track 3. The platform 1 has a drive for reciprocating the machine along the operating area, including a D.C. motor 4 and a double-speed reducing gear or gearbox 5, for the working and traversing speeds of the platform 1.

The platform 1 has mounted thereon a rotatable column 6 with a drive for rotating the column 6 about a vertical axis. This drive includes a two-stage worm gear reducer 7 connected to an asynchronous motor 8.

The rotatable column 6 has mounted thereon in a cantilever fashion a crossbeam 9 vertically reciprocable along the column 6. The end of the crossbeam 9 has rigidly fixed thereto a bracket 10 conjugated with a movable housing 11 of the column 6.

The bracket 10 is operatively connected with the movable housing 11 by means of a pivot 12 permitting pivoting of the crossbeam 9 relative to a horizontal plane, a stationary axis (not shown in the drawing) connecting the bracket to the movable housing 11 and the movable axis (not shown, either) of the bracket 10, i.e., the axis movable in the radial groove (not shown) of the bracket 10.

The movable housing 11 of the column 6 is provided with a mechanism for pivoting the bracket 10 with the crossbeam 9, which includes a lead screw 13 pivotably mounted on the movable housing 11 and carrying a handwheel 14, and a nut 15 pivotably connected with the bracket 10.

To facilitate pivoting of the crossbeam 9, the pivoting mechanism is provided with an air cylinder (not shown in the drawing). The motion of the crossbeam 9 with the movable housing 11 and the bracket 10 along the rotatable column 6 is effected by means of a chain transmission 16, of which the sprockets 17 and 18 are arranged at the opposite ends of the column 6, and a lift drive including a double-stage worm gear reducer 19 and a D.C. motor 20.

The free extremity of the crossbeam 9 has mounted thereon for reciprocation therealong a cutter carriage 21. Reciprocation of the carriage 21 along the crossbeam 9 is effected by means of a chain transmission 22, of which the sprockets 23, 24 are arranged at the opposite ends of the crossbeam 9, and a drive of the carriage 21, including a spur gear reducer 25 and a D.C. motor 26, mounted on the bracket 10.

The carriage 21 supports a cutting torch 27 mounted for longitudinal motion in a plane parallel with the axis of the crossbeam 9. The motion of the cutting torch 27 is effected by means of a drive 28 controlled by a copying or follow-up arrangement 29 rigidly coupled with the cutting torch 27 and providing for smooth motion of the cutting torch 27, a preset permanent clearance being maintained between the cutting torch 27 and a workpiece 30 being cut. The drive also provides, depending on the configuration of the workpiece, selection of an optimum cutting rate.

The copying or follow-up arrangement 29 has a known construction enabling it to follow the contour of the workpiece "by touch". The arrangement operates according to the following principles: when the spacing between the cutting torch and the workpiece is excessive, a forward feed is initiated; if the spacing is too small, a backward feed is initiated; when the spacing equals the preselected clearance, no feed is effected. Such a device is disclosed in U.S. Pat. No. 3,819,162.

When a workpiece being cut is being followed by the cutting torch, the drives can be operated by a program control system.

Figure 2:
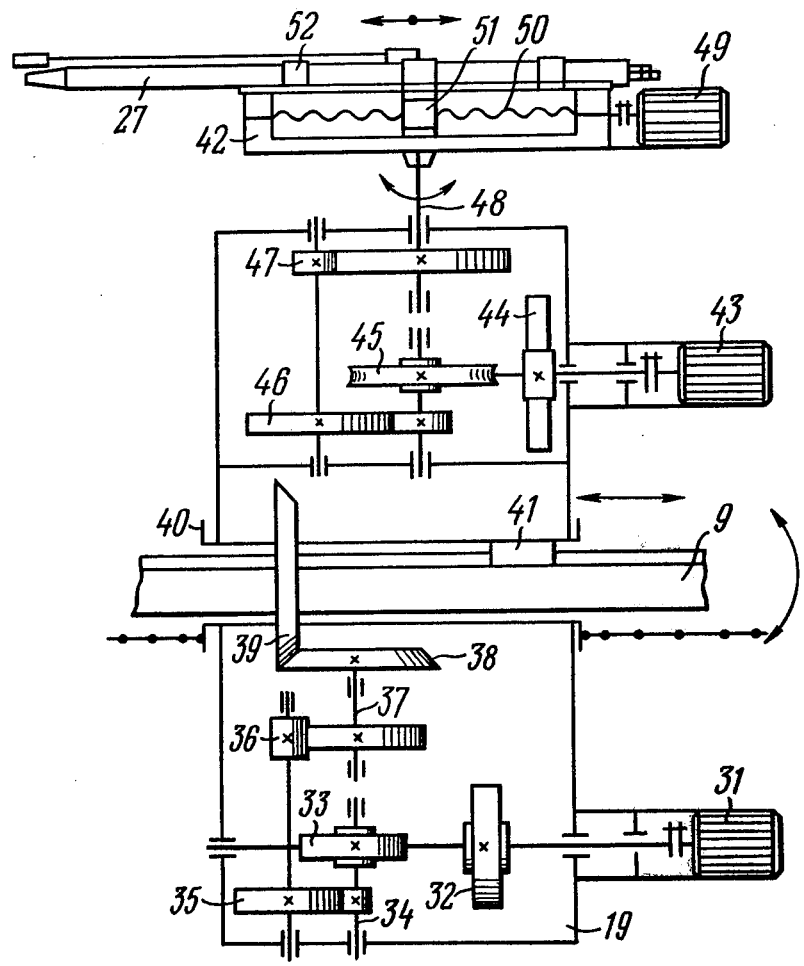
FIG. 2 is a schematic diagram illustrating the operative connection of the carriage mounted on the crossbeam with the rod and the cutting torch, in accordance with the invention.

According to the invention, the carriage 21 (FIG. 2) is fastened on the crossbeam for rotation in a plane perpendicular to the axis of the crossbeam. This is effected by means of an asynchronous motor 31 operatively connented through a stepdown spur gear couple 32, a worm gear couple 33 with an output shaft 34 driving a step-down spur gear couple 35, and a spur gear couple 36 connected with the step-down spur gear couple 35, the output shaft 37 of said couple 36 supporting a bevel gear 38 meshing with another bevel gear 39 fast, to the base 40 of the carriage 21. The base 40 is a tubular part provided on the internal surface of said carriage with a longitudinally secured slot 41 which prevents rotation of the base 40 of the carriage 21 relative to the crossbeam 9.

The carriage 21 has mounted thereon a rod 42 (FIG. 1) extending perpendicularly of the axis of the crossbeam 9 for rotation in a plane parallel with the said axis. This rotation is effected by means of an asynchronous motor 43 through a step-down reducer with a spur gear couple 44, a worm gear couple 45 and two step-down spur gear couples 46 and 47. The output shaft 48 of the reducer is secured to the rod 42.

Furthermore, the rod 42 is mounted on the carriage 21 for longitudinal motion in a plane parallel with the axis of the crossbeam 9. This longitudinal motion is effected by means of D.C. motor 49 mounted on the housing of the rod 42 and operatively connected with a lead screw-nut couple 50, 51, of which the nut 51 is rigidly coupled with the cutting torch 27.

The cutting torch 27 is connected with the rod 42. This connection is effected by means of two stirrups 52 mounted on the rod 42 and provided with screw-operated clamps (not shown in the drawing).

The machine further includes an operator's galley 53 (FIG. 1) mounted on the movable housing 11 of the column 6.

The motion of the mobile platform, of the galley with the operator's cab, of the carriage and of the cutting torch, as well as the jet of flame issued by the cutting torch, are controlled by the operator from a control panel 54 arranged on the operator's galley 53, or else, whenever required, from a portable control station 55.

The energy carriers (electric power, fuel gas, oxygen) are supplied to the machine from a distributor 56 through flexible hoses 57 and electric cables 58.

To fix the rotatable column 6 in a vertical position, there is provided a support column 59 of a box structure, of which the lower part houses the control module 60 of the machine, while the top face of the column 59 supports a roller 61 engaging an overhead monorail track 62 to prevent the toppling over of the column 59.

The herein disclosed machine for gas-oxygen cutting of metals operates as follows.

Prior to the commencment of the operation, corresponding gauges are consulted to make sure that gas under the required pressure is present in the distributor 56 wherefrom gas flows via the flexible hoses and the control panel 54 to the cutting torch 27.

Electric power is supplied via the cable 58, the control panel 54 and the control madule 60 for appropriate distribution of the power supply between the electric motors 4, 8, 20, 26, 31, 43, 49. Then by commands from the control panel 54 the machine is indexed relative to the workpiece 30. This is effected by energizing the electric motor 4 which drives the wheels 2 of the platform 1 by means of the reducer 5, whereby the machine rolls along the monorail track 3.

The column 6 is rotated by means of the electric motor 8 through an angle ensuring that the line of cutting lies in a plane parallel with the axis of the crossbeam 9.

The motor 20 is operated to drive the crossbeam 9 along the column 6 and thus to set the required height of the line of cutting.

The handwheel 14 is operated to set the required angle of inclination of the crossbeam 9 to the line of cutting. To move the carriage 21 into the initial position of cutting-in, the electric motor 26 is energized to drive the carriage 21 by means of the reducer 25 and the chain transmission 22.

The electric motor 31 is energized to rotate, by means of the bevel gear couple 38 and 39, the carriage 21 with the cutting torch 27, about the axis of the crossbeam 9 to the line of the plane of cutting, whereafter the cutting torch 27 is moved toward the workpiece 30 to set the required clearance, with the aid of the electric motor 49, the lead screw 50 and the nut 51.

By energizing the electric motor 43 to transmit its rotation through the spur gear couple 44, the worm gear couple 45, the spur gear couples 46, 47 and the output shaft 48 with the rod 42 secured thereto, the required angle of the torch 27 for cutting into the workpiece 30 is set.

With the workpiece 30 completely cut, the motor 26 is energized to drive the chain 22 by means of the reducer 25 with the sprocket 24 on its shaft, whereby the carriage 21 with the rod 42 and the cutting torch 27 is moved along the crossbeam 9.

Wherever necessary, the feed of the cutting torch 27 along the rod 42 can be superimposed upon the feed of the carriage 21 with parallel alignment of the axes of the rod 42 and of the crossbeam 9, or else upon the feed of the crossbeam 9 along the column 6 with parallel alignment of the axes of the rod 42 and of the column 6. The workpiece 30 of variable cross-section is followed by the cutting torch 27 with the aid of the copying or follow-up arrangement 29 which controls the reversing of the electric motor 49, which maintains the required clearance between the end face of the nozzle of the cutting torch 27 and the workpiece 30 by means of the lead screw-nut couple 50, 51 operatively connected with the cutting torch 27.

When the cutting operation is completed, the following steps are performed: the motor 26, which was driving the carriage 21 with the rod 42 and the cutting torch 27 axially of the crossbeam 9 through the reducer 25 is deenergized, the sprockets 23, 24 and the chain 22 are deenergized, and the motor 49 is energized to withdraw the cutting torch 27 from the workpiece by means of the lead screw 50 and the nut 51 rigidly coupled with the torch 27.

The sequence of starting the supply of the gases to commence the operation of the machine and of cutting off this supply upon the completion of the cutting operation is the same as in other hitherto known machines of a similar kind for gas-cutting of metals.

What is claimed is:

1. A machine for gas-cutting of metals, comprising: a mobile platform; a rotatable column mounted on said mobile platform; a crossbeam mounted in a cantilever fashion on said rotatable column and adapted for motion in a direction along the axis of said rotatable column; a carriage mounted on the free extremity of said crossbeam for reciprocation therealong, for rotation in a plane perpendicular to the axis of said crossbeam; a rod attached to said crossbeam perpendicular to the axis of said crossbeam for rotation in a plane parallel to said axis of said crossbeam and also for longitudinal motion in the same plane; a cutting torch rigidly coupled with said rod; and a copying arrangement operatively coupled with said cutting torch.

2. A machine according to claim 1, wherein a bevel gear couple is provided for the rotation of said carriage, one gear of said bevel gear couple being secured to the base of said carriage and another gear being operatively coupled with a drive.

3. A machine according to claim 1, wherein the rotation of said rod with said cutting torch is effected by a drive having an output shaft secured to said rod.

4. A machine according to claim 1, wherein the longitudinal motion of said rod in said plane parallel with the axis of said crossbeam is effected by a drive including a lead screw-nut couple of which the nut is secured to said cutting torch.

* * * * *